(12) United States Patent
Lourenco et al.

(10) Patent No.: US 8,287,722 B2
(45) Date of Patent: Oct. 16, 2012

(54) METHOD OF HYDROGENATION OF HEAVY OIL

(76) Inventors: José Lourenco, Toronto (CA); Hannu Salokangas, Edmonton (CA)

( * ) Notice: Subject to any disclaimer, the term of this patent is extended or adjusted under 35 U.S.C. 154(b) by 0 days.

(21) Appl. No.: 11/426,277

(22) Filed: Jun. 23, 2006

(65) Prior Publication Data
US 2006/0289339 A1    Dec. 28, 2006

Related U.S. Application Data

(63) Continuation of application No. PCT/CA03/02010, filed on Dec. 23, 2003.

(51) Int. Cl.
*C10G 45/00* (2006.01)
(52) U.S. Cl. .................. 208/142; 208/48 R
(58) Field of Classification Search .................. 208/142, 208/48 R
See application file for complete search history.

(56) References Cited

U.S. PATENT DOCUMENTS

| | | | |
|---|---|---|---|
| 2,456,035 A * | 12/1948 | Wobker | 208/155 |
| 2,989,461 A * | 6/1961 | Du Bois Eastman et al. | 208/107 |
| 3,117,072 A | 1/1964 | Eastman et al. | |
| 3,118,830 A | 1/1964 | Schlinger et al. | |
| 3,148,135 A | 9/1964 | Schlinger et al. | |
| 3,151,060 A | 9/1964 | Garbo | |
| 3,224,959 A | 12/1965 | Schlinger et al. | |
| 3,560,372 A * | 2/1971 | Van Driesen | 208/48 R |
| 3,792,067 A * | 2/1974 | Coombes et al. | 554/144 |
| 3,840,456 A | 10/1974 | Yavorsky et al. | |
| 3,933,620 A * | 1/1976 | Russum et al. | 208/108 |
| 4,290,999 A | 9/1981 | Morita et al. | |
| 5,133,941 A | 7/1992 | Hays et al. | |

FOREIGN PATENT DOCUMENTS

GB    807 887    1/1959

* cited by examiner

*Primary Examiner* — Walter D Griffin
*Assistant Examiner* — Brian McCaig
(74) *Attorney, Agent, or Firm* — Christensen O'Connor Johnson Kindness PLLC

(57) ABSTRACT

A method of hydrogenation of heavy oil. A first step involves providing a continuous pipe reactor defining a serpentine flow path. A second step involves heating heavy oil to lower the viscosity of the heavy oil. A third step involves pumping a turbulent flow of heavy oil and hydrogen through the continuous pipe reactor to promote addition of hydrogen into the heavy oil. The method has improved mass transfer due to the continuous turbulent flow through the continuous pipe reactor.

2 Claims, 1 Drawing Sheet

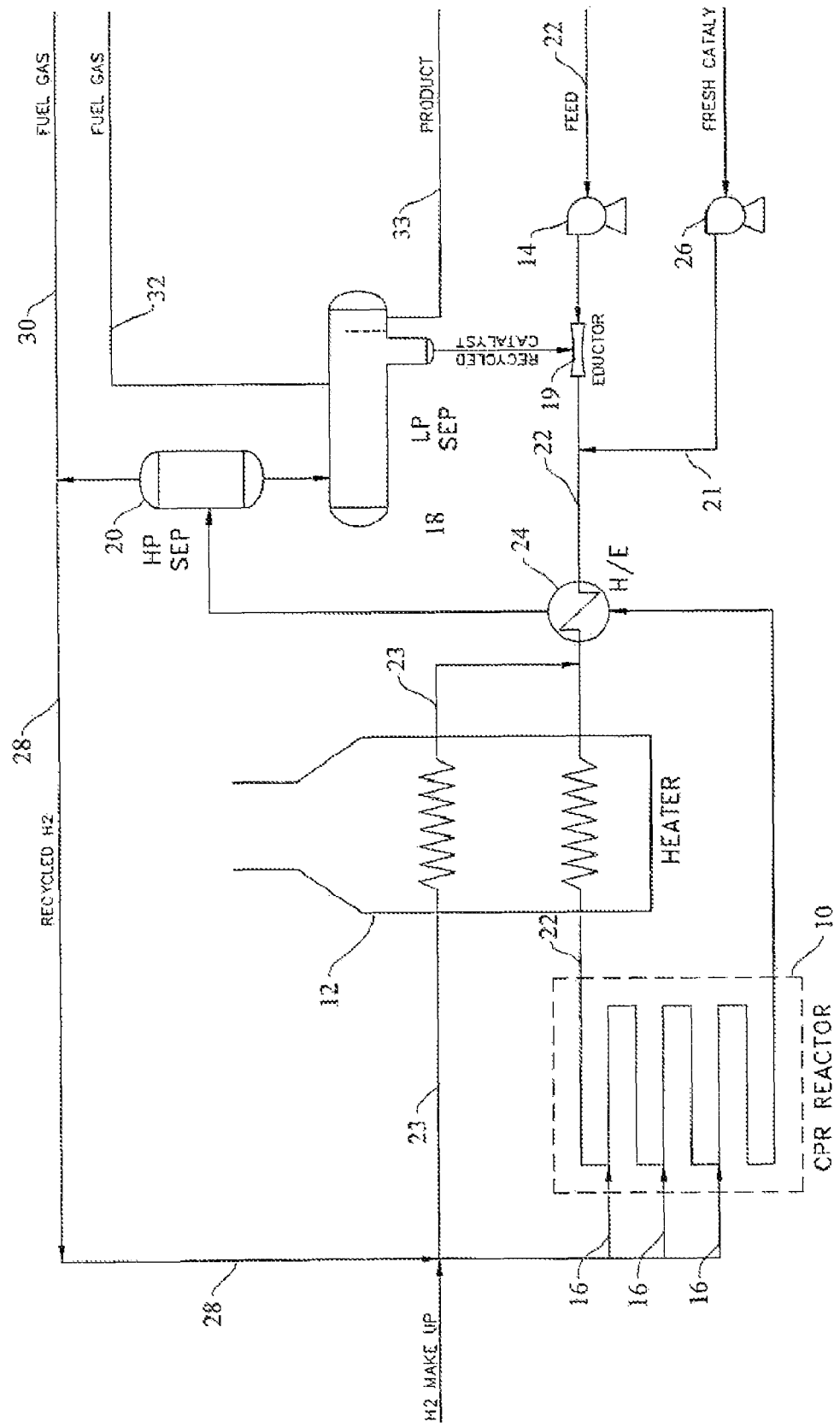

METHOD OF HYDROGENATION OF HEAVY OIL

FIELD OF THE INVENTION

The present invention relates to a method of upgrading heavy oil by adding hydrogen.

BACKGROUND OF THE INVENTION

The largest oil reserves in the world are primarily heavy oil. Heavy oil is defined as an oil with an API gravity between 5 and 20. They are typically high in sulfur content, in heavy metals and the bulk of it has a boiling point greater than 524 C. An upgrading facility is required to convert this heavy oil into lighter oil. Generally speaking heavy oils are hydrogen deficient, this is to say, they have more carbon than hydrogen. To upgrade this heavy oil there are two options; one is to remove the excess carbon and this is called coking, the other is by adding hydrogen and this is called hydrogenation. The carbon rejection processes typically produce liquid yields between 75 and 85% were as hydrogenation processes yield liquid volumes greater than 100%.

There are many commercial coking processes as well as hydrogenation processes throughout the world treating feedstocks from raw crudes to crude residuals. The demand for lighter fuels has created a need for improvements in processing the heavy crude.

The main problems present in hydrogenation processes are mass transfer and catalyst poisoning. To increase mass transfer hydrogen must be better mixed with the oil feedstock, it can be done by operating at higher pressures or by generating a turbulent flow. To decrease catalyst poisoning the heavy metals must be removed upstream of the catalyst or the poisoned catalyst removed on a continuous stream.

SUMMARY OF THE INVENTION

What is required is a method of hydrogenation of heavy oil having improved mass transfer.

According to the present invention there is provided a method of hydrogenation of heavy oil. A first step involves providing a continuous pipe reactor defining a serpentine flow path. A second step involves heating heavy oil to lower the viscosity of the heavy oil. A third step involves pumping a turbulent flow of heavy oil and hydrogen through the continuous pipe reactor to promote addition of hydrogen into the heavy oil.

The above described method has an improved mass transfer, as there is a continuous turbulent flow through the continuous pipe reactor. There are additional steps which may be added to further improve the results obtained through the use of the method.

Although beneficial results may be obtained through the use of the method, as described above, even more beneficial results may be obtained by including a further step of introducing a catalyst into the turbulent flow to promote the addition of hydrogen into the heavy oil. There are a number of commercially available catalysts which are suitable for use with this method. The use of a dispersed catalyst in the continuous flow reactor, ensures full exposure of the catalyst with the heavy oil and hydrogen.

Although beneficial results may be obtained through the use of the method, as described above, even more beneficial results may be obtained by including a further step of injecting make up hydrogen at spaced injection points along the continuous pipe reactor. When more hydrogen is injected and dissolved at various injection points, it promotes optimal reaction kinetics.

Although beneficial results may be obtained through the use of the method, as described above, even more beneficial results may be obtained by including a further step of positioning a catalyst recovery separator downstream of the continuous pipe reactor for the purpose of recovering and recycling catalyst. The continuous removal and separation of the dispersed catalyst, permits the user to control catalyst poisoning and, thereby, ensure milder operating conditions when compared to other catalytic processes.

Although beneficial results may be obtained through the use of the method, as described above, even more beneficial results may be obtained by a further step of positioning a hydrogen recovery separator downstream of the continuous pipe reactor for the purpose of recovering and recycling hydrogen.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein:

The FIGURE is a flow diagram of a method of hydrogenation of heavy oil in accordance with the teachings of the present invention.

DETAILED DESCRIPTION OF THE PREFERRED EMBODIMENT

The preferred method of hydrogenation of heavy oil will now be described with reference to the FIGURE.

A continuous pipe reactor 10 defining a serpentine flow path is provided. The heavy oil is heated by heater 12 to lower the viscosity of the heavy oil. A turbulent flow of heavy oil and hydrogen, along with a catalyst to promote addition of hydrogen into the heavy oil, is pumped through the continuous pipe reactor 10 by pump 14. Make up hydrogen is injected at spaced injection points 16 along the continuous pipe reactor 10. A catalyst recovery separator 18 is positioned downstream of the continuous pipe reactor 10 for the purpose of recovering and recycling catalyst. A hydrogen recovery separator 20 is also positioned downstream of the continuous pipe reactor 10 for the purpose of recovering and recycling hydrogen.

The heavy oil enters through the feed 22, and pump 14 drives the heavy oil through the pipes. The heavy oil has a catalyst injected into it by eductor 19 which draws recycled catalyst drawn from catalyst recovery separator 18. Fresh catalyst make up catalyst is added through line 21 downstream of eductor 19. Fresh catalyst is pumped through line 21 by pump 26 which is fed from a fresh catalyst source (not shown). The oil passes through a heat exchanger 24, where the heated oil exiting the continuous pipe reactor 10 transfers heat to the unheated oil. A hydrogen flow line 23 carries make up hydrogen from a hydrogen source (not shown) through heater 12. Flow line 23 injects hydrogen gas into feed line 22 downstream of heat exchanger 24, adding hydrogen to the mixture of oil and catalyst. The oil (with hydrogen and catalyst) is further heated by passing through heater 12. The now-heated oil then enters the continuous pipe reactor 10 where make up hydrogen is injected at spaced injection points 16. The oil is then pumped to through hydrogen recovery separator 20 and then through catalyst recovery separator 18. Hydrogen recovered through hydrogen recovery separator 20 is recycled through hydrogen supply line 28 for use at injection points 16 of continuous pipe reactor 10. Fuel gas is taken from hydrogen recovery separator 20 through flow line 30. Fuel gas is taken from catalyst recovery separator 18 through flow line 32. Product is drawn from catalyst recovery separator 18 through flow line 33.

In this patent document, the work "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A method of hydrogenation of heavy oil, comprising:
   pumping an untreated heavy oil along a feed conduit;
   adding recycled catalyst to the untreated heavy oil at a first position along the feed conduit;
   adding fresh catalyst to the untreated heavy oil, as needed to supplement the recycled catalyst, at a second position along the feed conduit downstream from the first position;
   preheating the untreated heavy oil by passing the untreated heavy oil through a heat exchanger through which passes treated heavy oil;
   injecting hydrogen gas into the preheated untreated heavy oil;
   heating the untreated heavy oil containing hydrogen in a heater to bring the untreated heavy oil up to a reaction temperature and lower the viscosity of the untreated heavy oil;
   providing a continuous pipe reactor of uniform pipe diameter defining an unrestricted serpentine flow path;
   pumping with a pump the untreated heavy oil containing hydrogen through the continuous pipe reactor to create a turbulent flow of untreated heavy oil containing hydrogen and promote addition of hydrogen into the untreated heavy oil, the pump driving the untreated heavy oil through the continuous pipe reactor to create the turbulent flow independent of hydrogen gas addition, the continuous pipe reactor being separate and distinct from both the heat exchanger and the heater;
   injecting make up hydrogen at spaced injection points along the continuous pipe reactor, a majority of hydrogen gas being added to the untreated heavy oil prior to entering the continuous pipe reactor, the injection of make up hydrogen at spaced injection points along the continuous pipe reactor being primarily for the purpose of controlling the reaction temperature; and
   positioning a catalyst recovery separator downstream of the continuous pipe reactor for the purpose of recovering and recycling catalyst for injection into the feed conduit.

2. The method as defined in claim 1, further comprising positioning a hydrogen recovery separator downstream of the continuous pipe reactor for recovering and recycling hydrogen.

\* \* \* \* \*